United States Patent
Becker et al.

(10) Patent No.: US 9,551,994 B2
(45) Date of Patent: Jan. 24, 2017

(54) SYSTEM AND METHOD FOR VEHICLE ATTITUDE CONTROL

(71) Applicant: The Boeing Company, Chicago, IL (US)

(72) Inventors: Gregory S. Becker, Culver City, CA (US); Shanshin Chen, Redondo Beach, CA (US); Dennis Y. Nakasone, Redondo Beach, CA (US); Erin M. Hammons, Redondo Beach, CA (US)

(73) Assignee: The Boeing Company, Chicago, IL (US)

( * ) Notice: Subject to any disclaimer, the term of this patent is extended or adjusted under 35 U.S.C. 154(b) by 30 days.

(21) Appl. No.: 14/739,563

(22) Filed: Jun. 15, 2015

(65) Prior Publication Data

US 2016/0363937 A1 Dec. 15, 2016

(51) Int. Cl.
*G05D 1/08* (2006.01)
*B64G 1/28* (2006.01)
*B64G 1/24* (2006.01)

(52) U.S. Cl.
CPC ............ *G05D 1/0883* (2013.01); *B64G 1/283* (2013.01); *B64G 1/285* (2013.01); *B64G 2001/245* (2013.01)

(58) Field of Classification Search
CPC ................................ B64G 1/283; B64G 1/285
See application file for complete search history.

(56) References Cited

U.S. PATENT DOCUMENTS

| | | | |
|---|---|---|---|
| 3,741,500 A | 6/1973 | Liden | |
| 4,723,735 A | 2/1988 | Eisenhaure et al. | |
| 5,112,012 A | 5/1992 | Yuan et al. | |
| 5,261,631 A | 11/1993 | Bender et al. | |
| 5,441,222 A | 8/1995 | Rosen | |
| 5,692,707 A | 12/1997 | Smay | |
| 5,820,079 A | 10/1998 | Harrell | |
| 5,826,829 A * | 10/1998 | Holmes | B64G 1/283 244/164 |

(Continued)

OTHER PUBLICATIONS

Markley, et al. "Maximum Torque and Momentum Envelopes for Reaction-Wheel Arrays", AIAA Guidance, Navigation and Control Conference, Aug. 2009, Chicago, Illinois, AIAA 2009-6109.

(Continued)

*Primary Examiner* — Joseph W Sanderson
(74) *Attorney, Agent, or Firm* — Perman & Green, LLP (57) ABSTRACT

A dual stage vehicle attitude control system includes a first attitude control module having at least two momentum wheels arranged to provide zero momentum vehicle attitude control, each momentum wheel comprises a limited travel two axis gimbal that pivots the momentum wheel along two of the three axes of the vehicle, a second attitude control module having reaction wheels arranged in a pyramid configuration to provide vehicle attitude control along at least one control axis that is common with a control axis of the at least two momentum wheels, and a controller connected to the first attitude control module and the second attitude control module, the controller being configured to coordinate actuation of the first attitude control module and the second attitude control module to rotate the vehicle in at least one of three axes of a vehicle.

24 Claims, 10 Drawing Sheets

(56) References Cited

U.S. PATENT DOCUMENTS

| | | | |
|---|---|---|---|
| 5,921,505 A * | 7/1999 | Spector | B64G 1/28 244/165 |
| 6,196,502 B1 | 3/2001 | Eyerly | |
| 6,241,194 B1 | 6/2001 | Heiberg | |
| 6,285,928 B1 * | 9/2001 | Tilley | B64G 1/283 244/165 |
| 6,439,510 B1 * | 8/2002 | Barde | B64G 1/283 244/164 |
| 7,198,232 B1 | 4/2007 | Ratan et al. | |

OTHER PUBLICATIONS

Markley, et al. "Maximum Torque and Momentum Envelopes for Reaction-Wheel Arrays", Journal of Guidance, Control, and Dynamics, vol. 33, No. 5, Sep.-Oct. 2010, pp. 1606-1614.

Tsiotras, et al. "Satellite Attitude Control and Power Tracking with Momentum Wheels", AAS/AIAA Astrodynamics Specialist Conference, AAS Publications Office, Paper AAS 99-317, Aug. 1999, pp. 1-12.

* cited by examiner

SYSTEM AND METHOD FOR VEHICLE ATTITUDE CONTROL

BACKGROUND

Generally attitude control of a vehicle in low gravity environments is obtained using, for example, propulsion, control moment gyroscopes, reaction wheels and momentum wheel platforms. Attitude control using propulsion results in coarse control that is generally not suitable for positioning a vehicle, having a precision pointing system, with high lateral angular acceleration for moving a precision pointing system between points within a small angular field of regard (e.g. an area of interest) and then moving the precision pointing system through large angles in up to three axes at reduced agility to reposition and reorient the vehicle in another area of interest. Control moment gyroscopes are agile and provide efficient torque and momentum but control moment gyroscopes are expensive. Reaction wheels provide uniform control in three axes, and can be biased efficiently in a single axis. However, reaction wheels require significant power to operate. Further, when multiple reaction wheels are required to meet high torque and momentum demands in two axes, increasing the number of reaction wheels is seen to provide diminishing returns when used in a pyramid configuration. Momentum wheel platforms with up to two degrees of freedom (e.g. tip/tilt motion) provide for high acceleration in two axes but their momentum storage is limited by the angular travel of the platform and the wheel sizing.

SUMMARY

Accordingly, a system and method, intended to address the above-identified concerns, would find utility.

One example of the present disclosure relates to a dual stage vehicle attitude control system including a first attitude control module having at least two momentum wheels arranged to provide zero momentum vehicle attitude control, each momentum wheel comprises a limited travel two axis gimbal, a second attitude control module having reaction wheels arranged in a pyramid configuration to provide vehicle attitude control along at least one control axis that is common with a control axis of the at least two momentum wheels, and a controller connected to the first attitude control module and the second attitude control module, the controller being configured to coordinate actuation of the first attitude control module and the second attitude control module to rotate the vehicle in at least one of three axes of a vehicle.

One example of the present disclosure relates to a method for controlling an attitude of a vehicle. The method includes controlling actuation of a first attitude control module and a second attitude control module to rotate the vehicle in at least one of three axes of the vehicle, where controlling actuation of the first attitude control module includes pivoting each momentum wheel along two of the three axes of the vehicle with a limited travel two axis gimbal, and wherein the first attitude control module is a momentum wheel module providing zero momentum vehicle attitude control at a first level of agility and the second attitude control module is a pyramidal reaction wheel module providing vehicle attitude control along at least one control axis that is common with a control axis of the momentum wheel module at a second level of agility, where the first level of agility is greater than the second level of agility.

One example of the present disclosure relates to a dual stage vehicle attitude control system including a first attitude control module having at least two momentum wheels arranged to provide zero momentum vehicle attitude control, each momentum wheel comprises a limited travel two axis gimbal that pivots the momentum wheel along two of the three axes of the vehicle, a second attitude control module having reaction wheels arranged in a pyramid configuration to provide vehicle attitude control along at least one control axis that is common with a control axis of the at least two momentum wheels, and a controller connected to the first attitude control module and the second attitude control module, the controller being configured to coordinate actuation of the first attitude control module and the second attitude control module to rotate the vehicle in at least one of three axes of a vehicle so the at least two momentum wheels provide zero momentum steering augmentation to the reaction wheels.

BRIEF DESCRIPTION OF THE DRAWINGS

Having thus described examples of the disclosure in general terms, reference will now be made to the accompanying drawings, which are not necessarily drawn to scale, and wherein like reference characters designate the same or similar parts throughout the several views, and wherein:

In the block diagram(s) referred to above, solid lines, if any, connecting various elements and/or components may represent mechanical, electrical fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings other than those depicted in the block diagrams may also exist. Dashed lines, if any, connecting the various elements and/or components represent couplings similar in function and purpose to those represented by solid lines; however, couplings represented by the dashed lines may either be selectively provided or may relate to alternative or optional aspects of the disclosure. Likewise, elements and/or components, if any, represented with dashed lines, indicate alternative or optional aspects of the disclosure. Environmental elements, if any, are represented with dotted lines.

In the block diagram(s) referred to above, the blocks may also represent operations and/or portions thereof. Lines connecting the various blocks do not imply any particular order or dependency of the operations or portions thereof.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Figure 1:
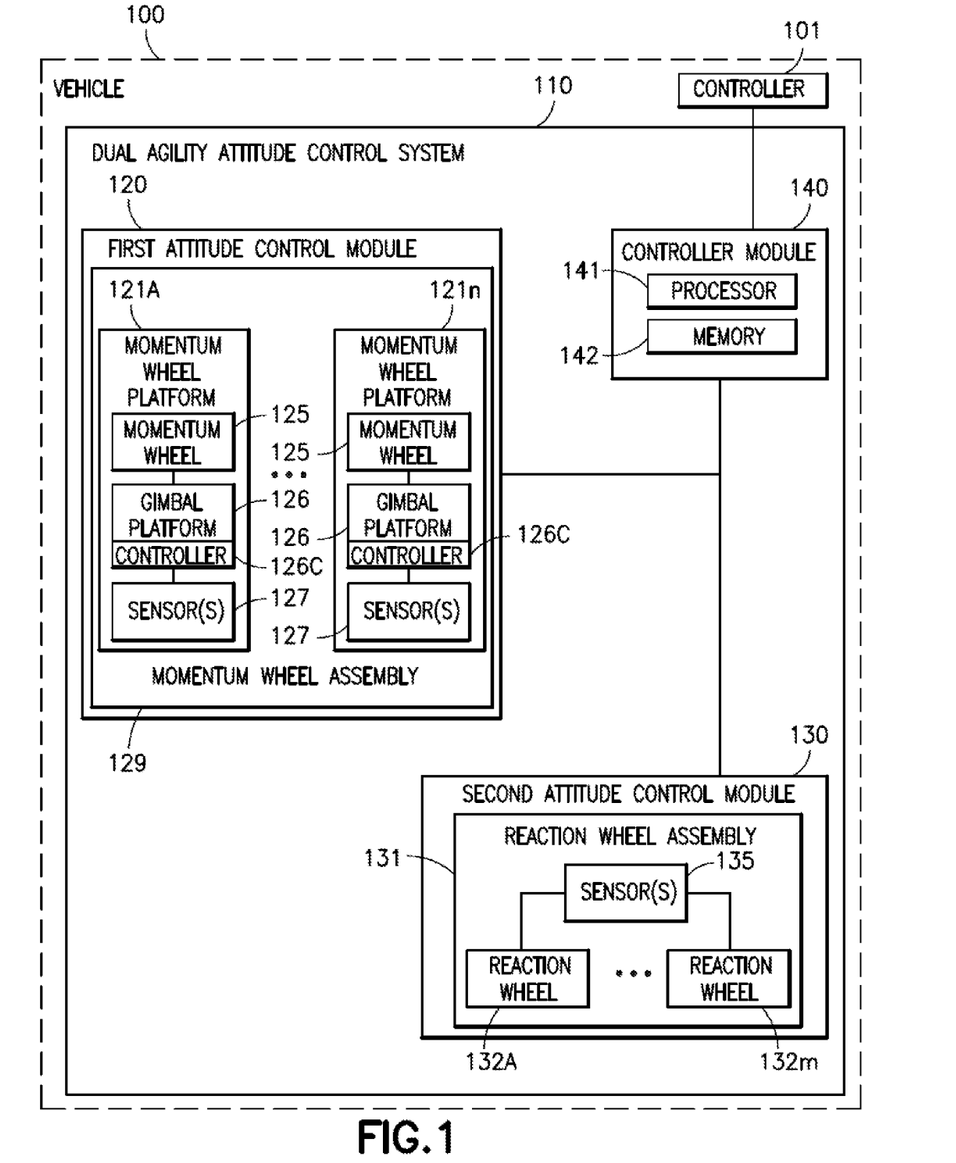
FIG. 1 is a block diagram of a dual agility attitude control system, according to one aspect of the present disclosure.
Figure 2:
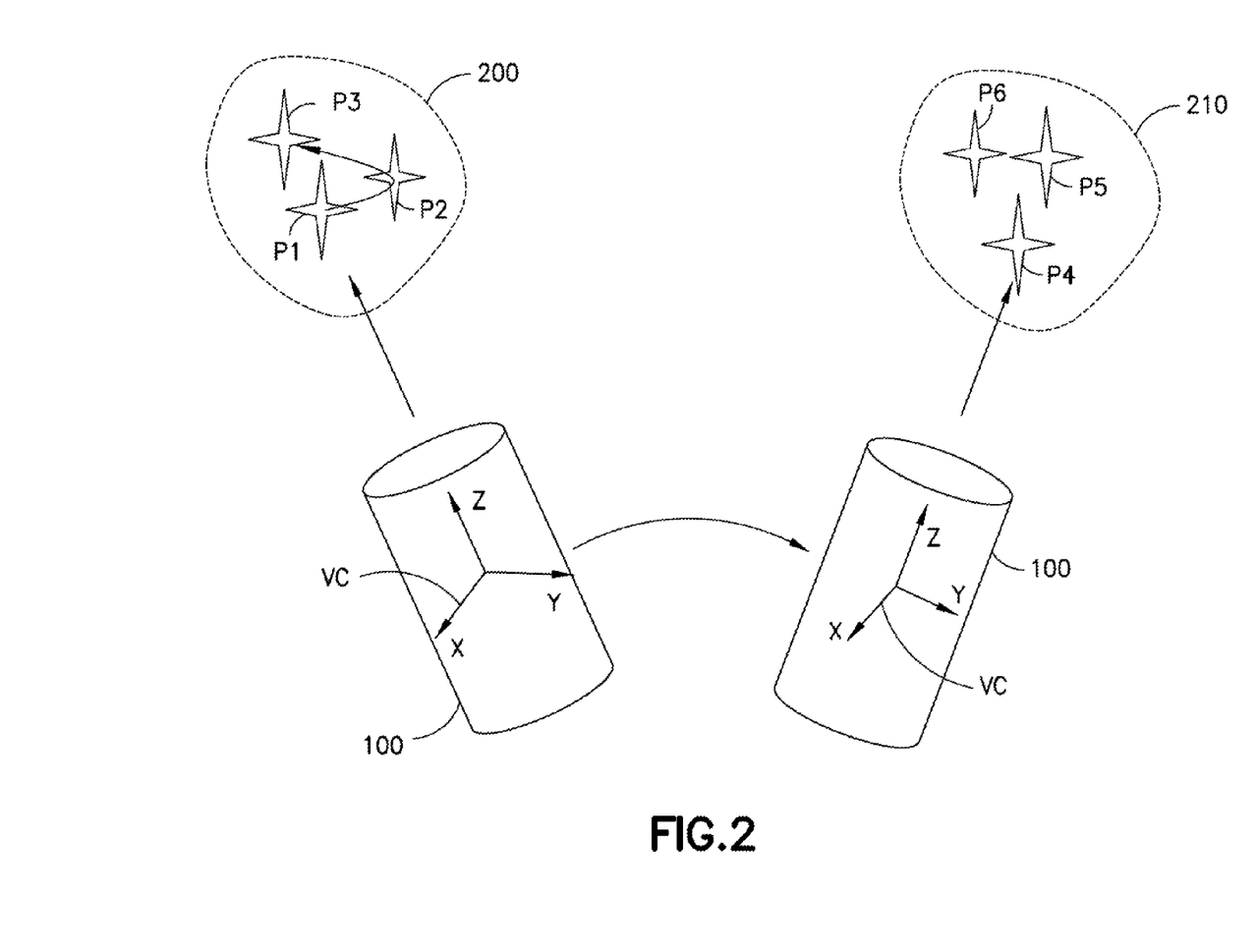
FIG. 2 is a schematic illustration of a vehicle incorporating the dual agility attitude control system, according to one aspect of the present disclosure.

Referring to FIGS. 1 and 2, the aspects of the present invention described herein provides for a dual agility attitude control system 110 that allows for the attitude control of vehicles 100, such as vehicles with precision pointing systems operated in low gravity environments, that require high lateral angular acceleration or high agility to move between points P1-P3 within a small angular field of regard such as, for example, a first area of interest 200 and then move through large angles in up to three axes at a reduced agility in order to reposition and reorient the vehicle 100 in another area of interest 210 having a small angular field of regard such as, for example, a second area of interest that is different than the first area of interest) for observing one or more points P4-P6 within the other area of interest 210.

Referring to FIG. 1, the aspects of the dual agility attitude control system 100 provide for a combined or dual agility pointing system that combines a reaction wheel array and two or more momentum wheel platforms to provide a cost effective alternative to control moment gyroscopes. For example, by trading the benefits and limitations of reaction wheels in a pyramid configuration and a zero-momentum steering system of momentum wheel platforms, an attitude control system is provided that requires less average power and fewer momentum storage devices than a conventional attitude control system having the same number of degrees of freedom of vehicle movement. The dual agility attitude control system 100 includes, for example, a first attitude control module 120, a second attitude control module 130 and a controller module 140 that is connected to the first attitude control module 120 and the second attitude control module 130 through a wired or wireless connection. The controller module 140 includes at least one processor 141 and at least one memory 142 that are configured with non-transitory programming to control the first attitude control module 120 and the second attitude control module 130 in the manner described herein. For example, the controller module 140 is configured to coordinate the actuation of the first attitude control module 120 and the second attitude control module 130 to rotate the vehicle in at least one of the three axes X, Y, Z of the vehicle 100. In one aspect the controller module 140 is integral to the vehicle 100 controller 101 while in other aspects the controller module 140 is a subsystem of the vehicle 100 controller 101 that receives navigation/pointing commands from the controller 101 for changing an attitude of the vehicle 100 as described herein.

The first attitude control module 120 is a propellantless attitude control module that includes a momentum wheel assembly 129 having two or more momentum wheel platforms 121A-121n. Each of the momentum wheel platforms 121 includes a momentum wheel 125 mounted to a gimbal platform 126 and two or more sensors 127 for determining a rotational speed of the momentum wheel and an angular position of the gimbal platform 126. The gimbal platform 126 includes a base portion 300 and a movable portion 310 pivotally mounted to the base portion 300 so that the movable portion 310 tips and tilts along the X and Y axes relative to the base portion 300. In one aspect the tip and tilting motion is, for example, a pivoting or rotational motion. In one aspect the base portion 300 and the movable portion 310 form, for example, a two axis gimbal. In other aspects the two axis gimbal platform 126 has any configuration that provides independent control of, for example, both the X and Y axes. In one aspect, the X and Y axes of the gimbal correspond to the X and Y axes, respectively, of the vehicle coordinate system VC (FIGS. 2 and 4) while in other aspects the coordinate system of the gimbal is in a known spatial orientation, but different from the coordinate system VC of the vehicle 100. The base portion includes actuators 315X, 315Y for pivoting the movable portion 310 along a respective one of the X and Y axes to control the angular position θ of the movable portion 310, angular rate of movement $\omega x$, $\omega y$ along the X and Y axes of the movable portion 310 and acceleration of the movable portion along the X and Y axes. It is noted that the amount of travel of the gimbal platform 126 along the X and Y axes is limited by an amount of travel or movement of the respective actuator 315X, 315Y and/or limiting structure, such as for example the base 300 or stops mounted to or protruding from the base 300, of the gimbal platform 126. In one aspect, the amount of travel of the gimbal platform 126 has, for example, limited rotation about the respective axis where the gimbal platform is restrained from unlimited rotation about the X and Y axis. In one aspect the actuators 315X, 315Y provide the gimbal platform with up to about 10° of pivotal or rotational movement along the X and Y axes while in other aspects the actuators 315X, 315Y provide the gimbal platform with more than about 10° of pivotal or rotational movement. In other aspects, an amount of pivotal movement of the gimbal platform along the X axis is different than an amount of pivotal movement of the gimbal platform along the Y axis. The size or power of the actuator 315X, 315Y along each axis X, Y depends on, for example, the torque generated by the cross axis actuator 315X, 315Y. For example, there is a torque along the X axis required to generate the angular rate of movement $\omega x$ along the X axis which results in a cross axis Y axis torque (see equation 2 herein). The cross axis actuator, which in this example is the Y axis actuator, is sized to resist the cross axis Y axis torque. Similarly, there is a torque along the Y axis required to generate the angular rate of movement $\omega y$ along the Y axis which results in a cross axis X axis torque (see equation 1 herein). The cross axis actuator, which in this example is the X axis actuator, is sized to resist the cross axis X axis torque. In one aspect, the actuators 315X, 315Y are sized to provide a torque level equal to the cross product of an angular velocity vector of the gimbal platform 126 and an angular momentum vector H of the momentum wheel 125. In one aspect the actuators 315X, 315Y are voice coil/linear actuators while in other aspects the actuators 315X, 315Y are limited travel rotary actuators such as gear driven direct current actuators (such as e.g. a geared rotary drive), ball screw actuators, stepper motor actuators or other linear/rotary drive system capable of pivoting the movable portion 310 along the respective X and Y axes. The movable portion 310 includes a drive motor 330 to which the momentum wheel 125 is mounted for rotation about the Z axis. The torque Tx, Ty along the X and Y axes exerted on the vehicle 100 by each momentum wheel 125 can be defined by the following equations, which ignore second order terms for clarity:

$$Tx = \omega y X H \quad [1]$$

$$Ty = -\omega x X H \quad [2]$$

where H is the angular momentum vector of the respective momentum wheel 125. As can be seen from the above equations, the torque exerted on the vehicle 100 by each momentum wheel 125 is a function of the gimbal platform 126 angular rate of movement $\omega x$, $\omega y$.

Figure 3A:
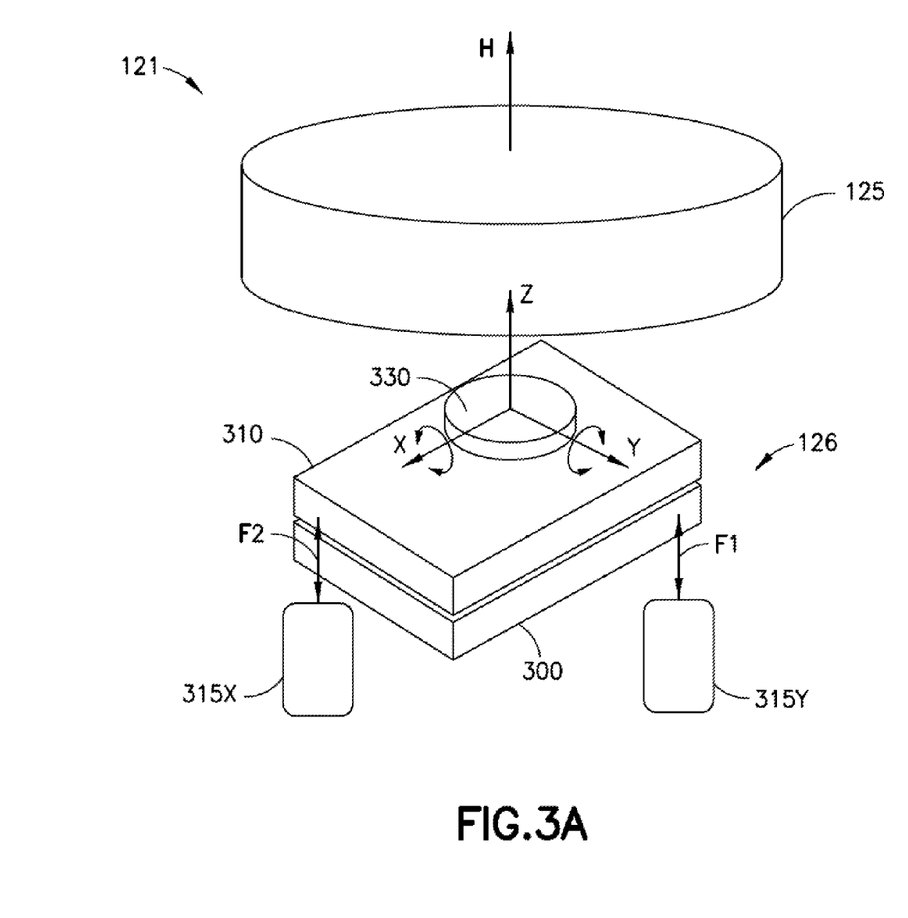
FIGS. 3A and 3B are schematic illustrations of a portion of the dual agility attitude control system, according to one aspect of the present disclosure.
Figure 3B:
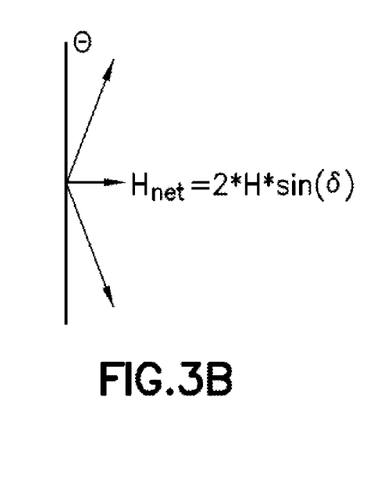
Figure 4:
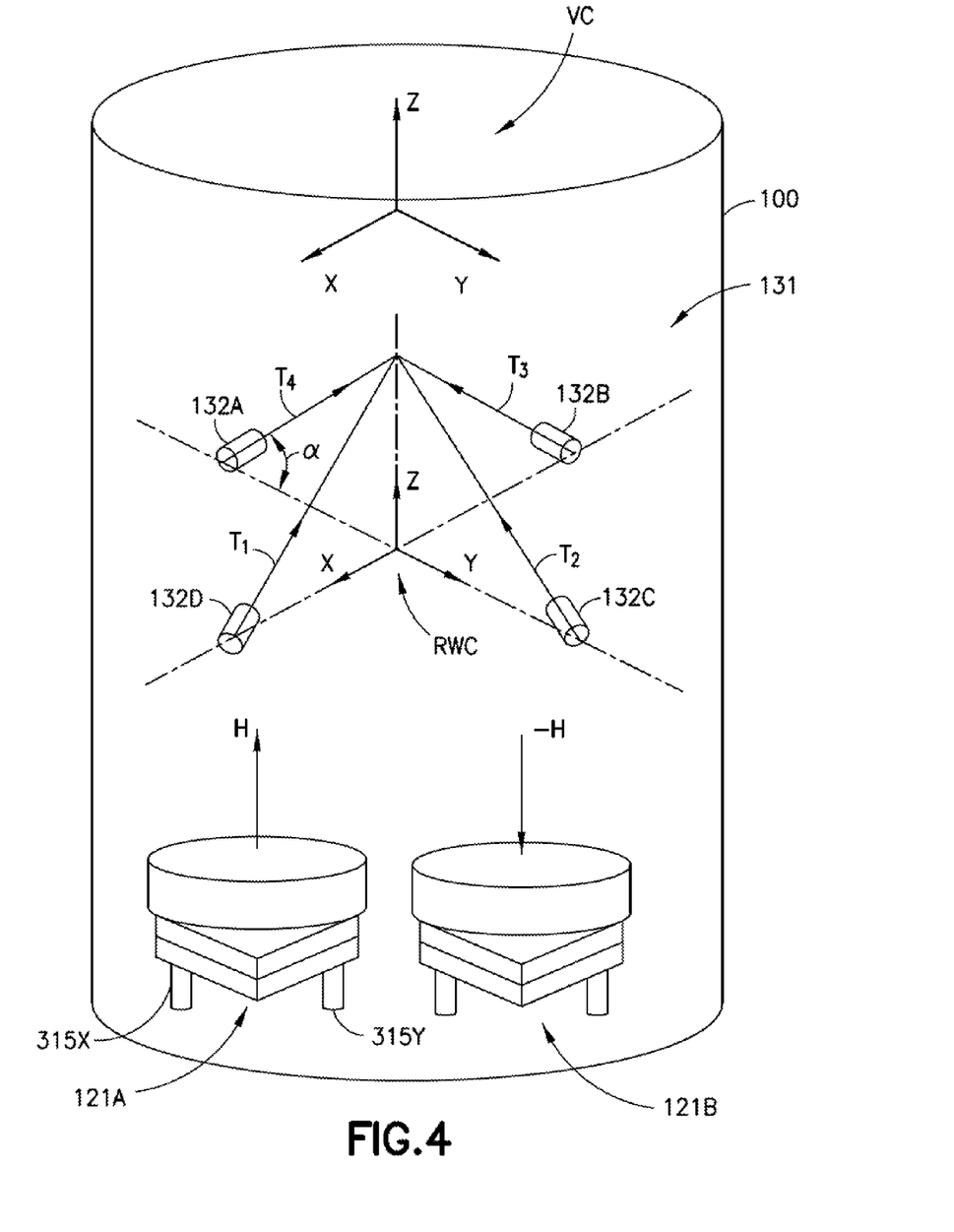
FIG. 4 is a schematic illustration of the dual agility attitude control system, according to one aspect of the present disclosure.

Referring also to FIGS. 3B and 4 in one aspect two momentum wheel platforms 121A, 121B are arranged within the vehicle 100 in a back to back configuration to provide. In one aspect, the back to back configuration is, for example, side by side or in-line with each other along a common axis of the vehicle 100 such as the Z axis. In one aspect, the net zero-momentum is where the angular momentum vectors H of the two momentum wheel platforms 121A, 121B are equal and opposite and arranged parallel with, for example, the Z axis of the vehicle when the momentum wheels are at a nominal gimbal angle $\theta$. In other aspects more than two momentum wheel platforms 121A-121n are arranged within the vehicle 100 to provide the net zero-momentum where the momentum wheel platforms are aligned as opposing pairs so that each pair is aligned along any axis rotated relative to the vehicle frame, but each momentum wheel platform within the pair itself are aligned with each other. For the equal and opposite rates of the momentum wheel platforms 121A-121n, such as, for example, the two momentum wheel platforms 121A, 121B, the torque Tx, Ty exerted on the vehicle 100 becomes:

$$Tx = 2 * H * \omega y \quad [3]$$

$$Ty = -2 * H * \omega x \quad [4]$$

where the net momentum vector is:

$$H\text{net} = 2 * H * \sin(\theta) \quad [5]$$

In the configuration shown in FIG. 4 (e.g. two momentum wheel platforms 121A, 121B are arranged within the vehicle 100 in a back to back configuration) the two momentum wheels 121A, 121B provide for high torques along the X and Y axes. However, the momentum capability of the momentum wheel platforms 121A-121n to induce a change in momentum of the vehicle 100 through a spatial position change of the momentum wheel platforms 121A-121n is limited by the angular travel (e.g. angle $\theta$) of the gimbal platform 126.

Referring to FIGS. 1 and 4, the second attitude control module 130 is a propellantless attitude control module that includes a reaction wheel assembly 131. The reaction wheel assembly 131 includes one or more reaction wheels 132A-132m and one or more sensors 135 configured to determine the rate of rotation of each reaction wheel 132A-132m. In one aspect the reaction wheel assembly 131 includes four reaction wheels 132A-132D but in other aspects the reaction wheel assembly 131 includes more or less than four reaction wheels. In one aspect, the number of reaction wheels 132A-132m is different than the number of momentum wheels 121A-121n while in other aspects, where multiple pairs of momentum wheels 121A-121n are employed the number of reaction wheels 132A-132m may be equal to the number of momentum wheels 121A-121n. In this aspect, the reaction wheels 132A-132D are oriented within the vehicle 100 so that the axes of the reaction wheels 132A-132D, and the torque vectors T1-T4, are tipped or angled towards the Z axis of the reaction wheel assembly coordinate system RWC which in one aspect is coincident with the vehicle coordinate system VC. The torque exerted along the Z axis by the reaction wheel assembly 131 is dependent on the angle α at which the respective reaction wheels 132A-132D is tipped towards the Z axis. The torques along the X and Y axes of the reaction wheel assembly coordinate system RWC (and the vehicle 100 where the vehicle coordinate system VC is coincident with the reaction wheel assembly coordinate system RWC) are less sensitive to the reaction wheel assembly because the gains exerted on the vehicle 100 by the reaction wheel assembly 131 are shared by both the X and Y axes. In one aspect, for a dual agility attitude control system 110 that scans a single axis the Z axis of the reaction wheel coordinate system RWC is oriented with the scan axis of the vehicle 100 (such as, e.g., the Z axis) and the size and number of the reaction wheels 132A-132m and their angle α are determined based on, for example, the agility requirements of the vehicle 110. For a dual agility attitude control system 110 that scans in more than one axis, such as for example scans in two axes, the X and Y axes of the reaction wheel assembly 131 are arranged along the scan axes of the vehicle 100 and the size and number of the reaction wheels 132A-132m and their angle α are determined based on, for example, the agility requirements of the vehicle 110.

Figure 5:
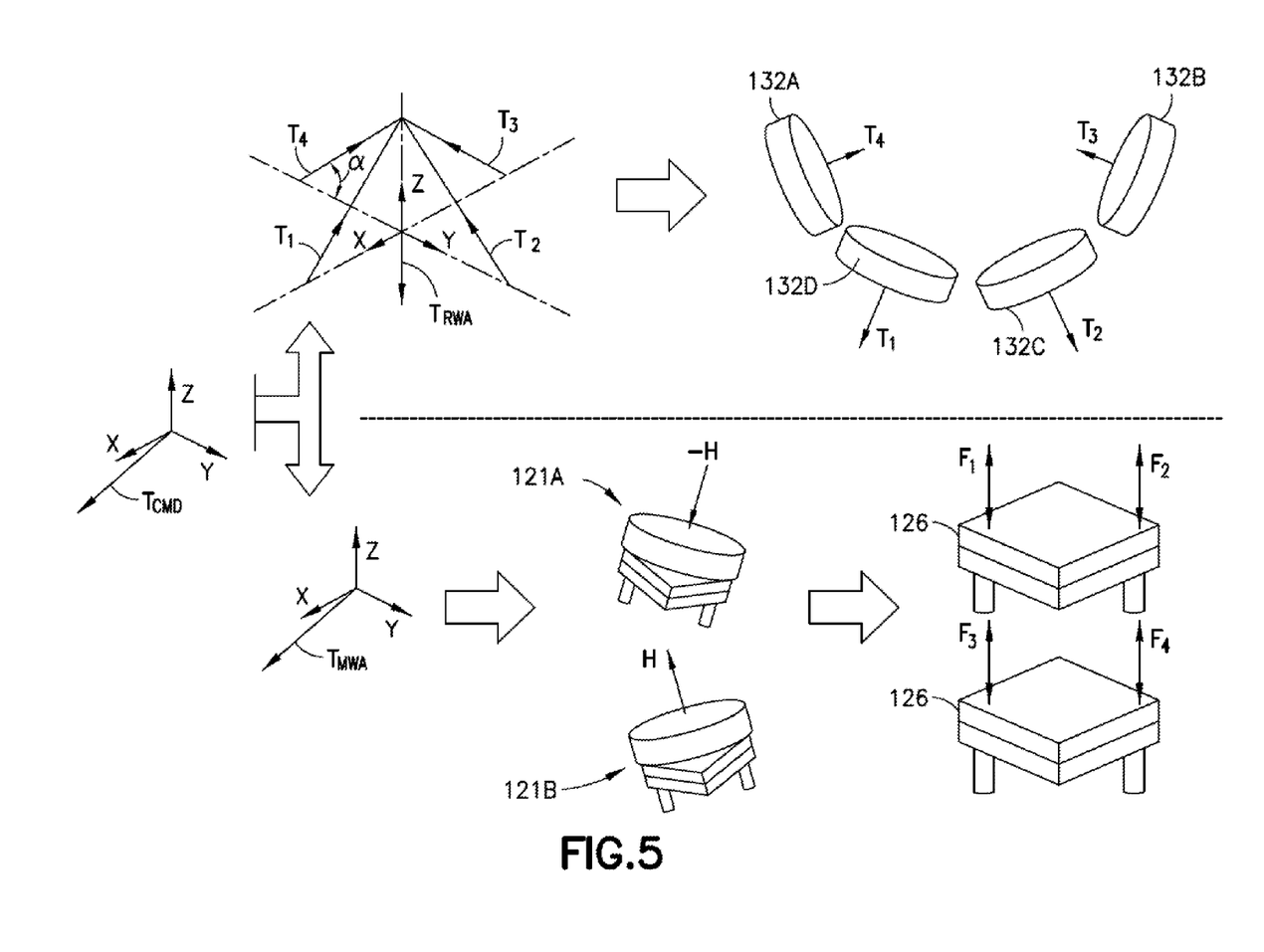
FIG. 5 is a schematic illustration of a hierarchical control scheme for the dual agility attitude control system, according to one aspect of the present disclosure.
Figure 6:
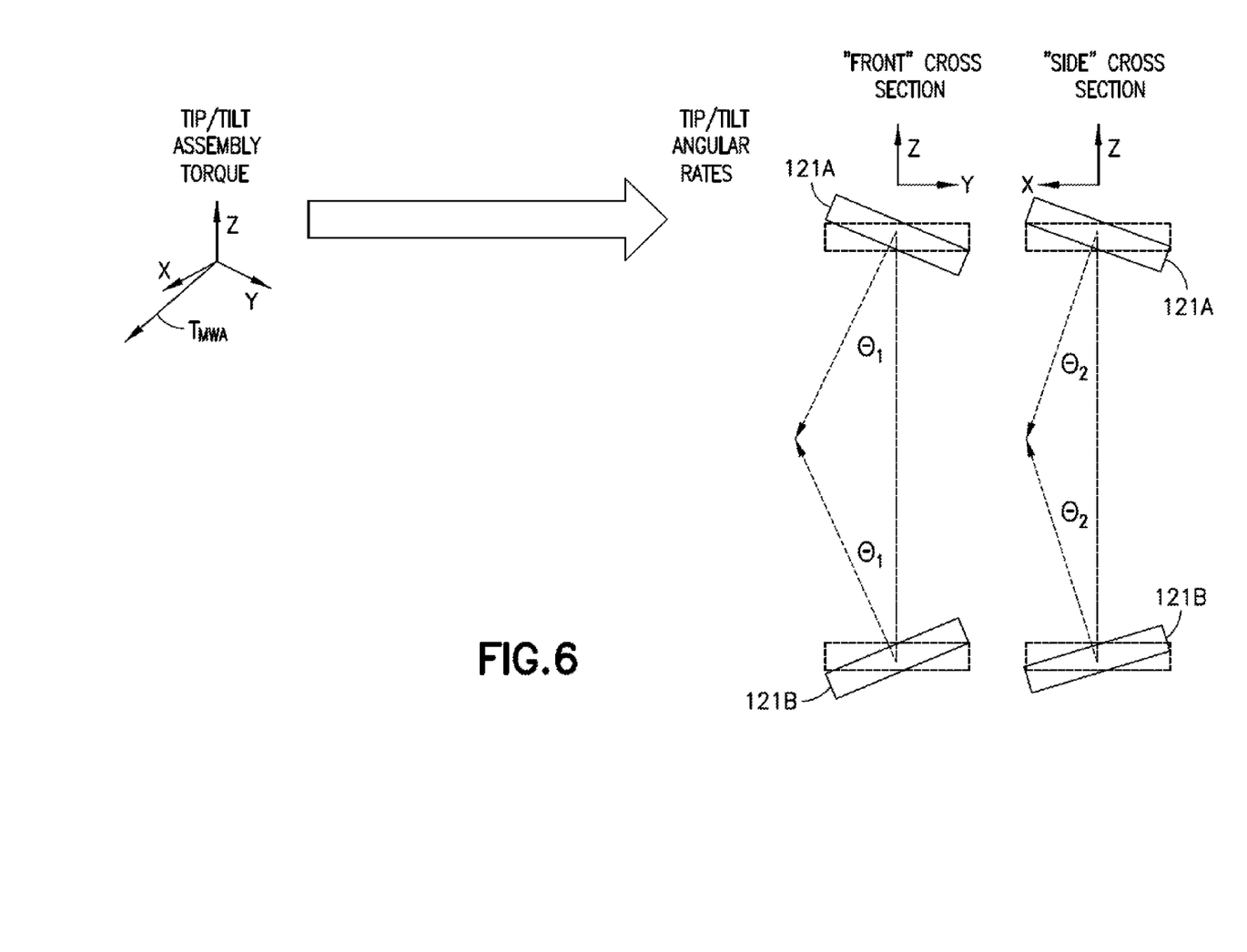
FIG. 6 is a schematic illustration of a portion of the hierarchical control scheme of FIG. 5, according to one aspect of the present disclosure.
Figure 7:
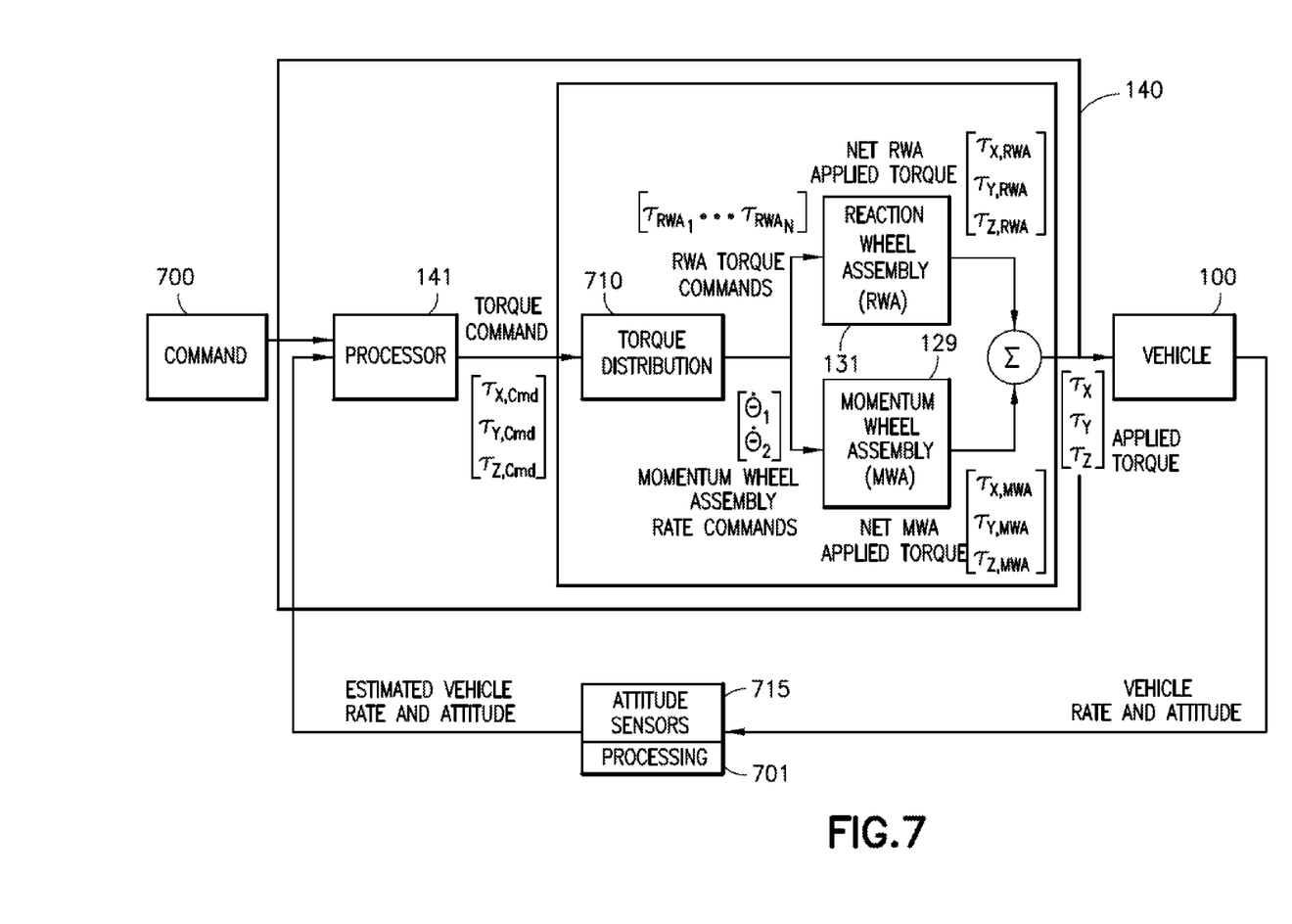
FIG. 7 is a schematic illustration of a control method for the dual agility attitude control system, according to one aspect of the present disclosure.

Referring again to FIGS. 1 and 2, in accordance with an aspect of the disclosed embodiment, the first attitude control module 120 is sized to provide a predetermined acceleration of the vehicle 100 within the first area of interest 200, second area of interest 210, . . . , $n^{th}$ area of interest (e.g. the areas that require high lateral angular acceleration/high agility for moving the vehicle between points P1-P3, P4-P6 within a small angular field of regard). In one aspect the second attitude control module 130 is sized to provide a predetermined acceleration of the vehicle 100 within a moderate agility region disposed between the first area of interest 200, second area of interest 210, . . . , $n^{th}$ area of interest for moving the vehicle 100 through large angles in up to three axes at a reduced agility in order to reposition and reorient the vehicle 100 between the areas of interest 200, 210. As described above, in one aspect, the reaction wheel assembly 131 is oriented within the vehicle 100 so that the Z axis of the reaction wheel coordinate system RWC is coincident with the vehicle coordinate system VC (or, e.g., the axis along which the momentum wheels 125 are spinning) where the reaction wheel assembly 131 meets a predetermined agility of the vehicle 100 for reorienting the vehicle 100 between the areas of interest 200, 210 and the transverse rate capability of the reaction wheel assembly 131 reduces the need for large angular travel of the gimbal platforms 126. While, in one aspect, the vehicle 100 is controlled through individual operation the first attitude control module 120 and the second attitude control module 130 as described herein, in other aspects, the first attitude control module 120 and the second attitude control module 130 are simultaneously operated to control the vehicle 100. For example, the second attitude control module 130 generally has a lower transverse acceleration capability than the first attitude control module 120 however, the second attitude control module 130 is typically large enough to provide beneficial transverse acceleration in addition to that provided by the first attitude control module 120. In one aspect, the high agility gimbal platform 126 of the first attitude control module provides for high accelerations however, the second attitude control module 130 provides, in one aspect, better performance when achieving a maximum rate of movement. As an example, the first attitude control module 120 is used alone, or in combination with the second attitude control module 130, for acceleration limited slews or movements of the vehicle 100, where the maximum rate of movement is not achieved. In one aspect the second attitude control module 130 alone, or in combination with the first attitude control module 120, provides moderate agility (acceleration) along the axis that is normal to the two gimbal platform axes. In one aspect, the second attitude control module 130 sized for the normal axis provides residual control capability along the two axes, which in this example are, e.g., the X and Y axes, of the gimbal platform 126 as long as the angle α (see FIG. 5) is not 90°. In one aspect, the first attitude control module 120 provides for the agility (e.g. acceleration) capability along the two axes of the gimbal platform 126 while the residual control capability of the second attitude control module 130 in the two axes of the gimbal platform 126 reduces the attitude control requirements on the first attitude control module 120. In one aspect where the first attitude control module 120 includes momentum wheel platforms where the momentum wheel axis is aligned along, e.g., the Z axis (or any other axis) of the vehicle, the second attitude control module 130 is sized to provide the necessary agility of the vehicle along the Z axis or, e.g., the axis along which the momentum wheels are aligned.

Figure 8:
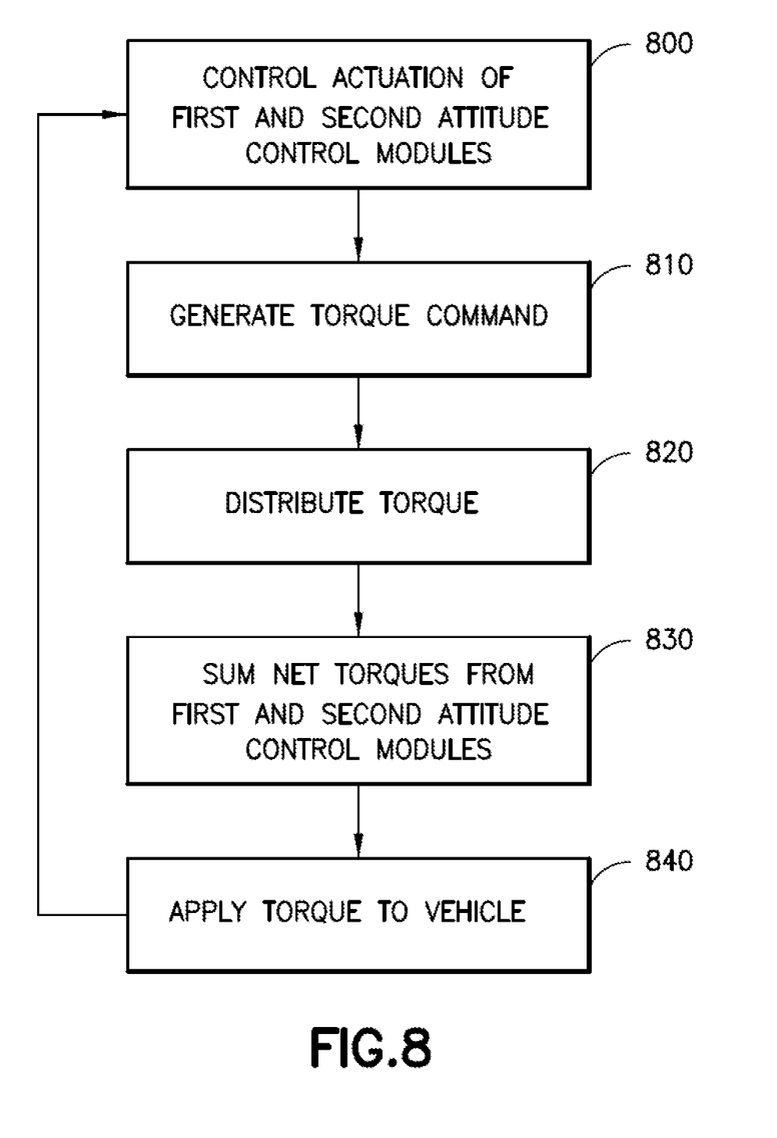
FIG. 8 is a flow diagram of a method, according to one aspect of the present disclosure.

Referring to FIGS. 1 and 4-8 the controller module 140 is configured to control the vehicle 100, e.g. under the command 700 of for example, controller 101 or by remote ground based control, through a combination of the first attitude control module 120 and the second attitude control module 130 (FIG. 8, Block 800). The controller module 140 controls the first attitude control module 120 and the second attitude control module 130 to rotate or orient the vehicle 100 along at least one of three axes X, Y, Z of the vehicle 100. In one aspect, a commanded vehicle torque τxcmd, τycmd, τzcmd is generated by the processor 141 of the controller module 140 from the commands 700 from the controller 101 (FIG. 8, Block 810). The controller module 140 controls the first attitude control module 120 and the second attitude control module 130 according to a hierarchical distribution law/scheme where the torque distribution 710 of the commanded vehicle torque τxcmd, τycmd, τzcmd to the individual actuator (e.g. individual reaction wheels 132A-132m and individual momentum wheel platforms 121A-121n) is hierarchical (FIG. 8, Block 820). For example, the controller module 140 provides a time varying distribution of the commanded vehicle torque τxcmd, τycmd, τzcmd between the first attitude control module 120 and the second attitude control module 130. This time varying distribution is application dependent where, for example, in one aspect the first attitude control module 120 is prioritized for the small angle high agility regions described above (e.g. the first attitude control module 120 provides higher vehicle accelerations relative to the second attitude control module 130 for accelerating the vehicle 100 to a maximum predetermined rate or reorientation). In one aspect, for a reaction wheel assembly 131 vehicle torque sub-distribution, the controller module 140 distributes the commanded vehicle torque Tcmd, including torque components τxcmd, τycmd, τzcmd, to each reaction wheel as, e.g., reaction wheel torque commands $\tau_{RWA1}, \tau_{RWA2}, \ldots, T_{RWAn}$. In one aspect, the controller module 140 distributes the commanded vehicle torque Tcmd using, for example, one or more of a constant minimum Euclidean norm $L_2$ distribution and null space steering (e.g. where there is no net control torque on the vehicle 100) and a minimization of a maximum value norm $L_\infty$ momentum envelope facet dependent distribution (such as, e.g. described in Markley et al., *Maximum Torque and Momentum Envelopes for Reaction Wheel Arrays*, AIAA Guidance, Navigation, and Control Conference 10-13 Aug. 2009, Chicago, Ill., the disclosure of which is incorporated herein by reference in its entirety) to produce a predetermined net reaction wheel applied torque $T_{RWA}$, including the components $\tau x_{RWA}, \tau y_{RWA}, \tau z_{RWA}$. In other aspects the reaction wheel assembly 131 vehicle torque sub-distribution is provided in any predetermined manner.

In one aspect, for the momentum wheel assembly 129 vehicle torque sub-distribution, the controller module 140 distributes the commanded vehicle torque Tcmd into a rate command $\dot{\theta}1, \dot{\theta}2$ for each pair of momentum wheel platforms 121A-121n. For example, where there are two momentum wheel platforms 121A, 121B the controller module 140 distributes the commanded vehicle torque Tcmd into two (e.g. one for each momentum wheel platform) two axis gimbal angular rate commands. In one aspect, referring to FIG. 6, the commanded vehicle torque Tcmd is defined by, for example:

$$\begin{bmatrix} Tx \\ Ty \\ Tz \end{bmatrix} = \begin{bmatrix} 0 & 2\cos\theta_2 H \\ -2\cos\theta_1 H\cos\theta_2 H & 2\sin\theta_1 H\sin\theta_2 H \\ 0 & 0 \end{bmatrix} \begin{bmatrix} \dot{\theta}_1 \\ \dot{\theta}_2 \end{bmatrix} \quad [6]$$

from which the rate command $\dot{\theta}1, \dot{\theta}2$ can be determined as follows:

$$\begin{bmatrix} \dot{\theta}_1 \\ \dot{\theta}_2 \end{bmatrix} = \begin{bmatrix} 0 & 2\cos\theta_2 H \\ -2\cos\theta_1 H\cos\theta_2 H & 2\sin\theta_1 H\sin\theta_2 H \end{bmatrix}^{-1} \begin{bmatrix} Tx \\ Ty \end{bmatrix} \quad [7]$$

In one aspect, it is noted that in equations [6] and [7] the angles θ1 of each gimbal platform 126 are equal and opposite. Similarly, it is noted that in equations [6] and [7] the angles θ2 of each gimbal platform 126 are equal and opposite. In other aspects the angles θ1 and θ2 respectively may be different from one another. It is noted that the equations provided herein are exemplary and the torques/rate commands of equations [6] and [7] can be derived in a similar manner with similar equations without departing from the aspects of the present invention. In one aspect, each gimbal platform 126 includes a controller 126C that converts the two axis gimbal angular rate commands $\dot{\theta}1, \dot{\theta}2$ into two axis gimbal torque commands, which are subsequently converted into the equivalent gimbal platform 126 actuator 315X, 315Y forces F1, F2, F3, F4 for generating the net momentum wheel applied torque $T_{MWA}$ (including components $\tau x_{MWA}$, $\tau y_{MWA}$, $\tau z_{MWA}$).

Still referring to FIGS. 1 and 4-7 the net reaction wheel applied torque $T_{RWA}$ and the net momentum wheel applied torque $T_{MWA}$ are summed together to produce the applied vehicle torque T, including components $\tau x$, $\tau y$, $\tau z$, (FIG. 8, Block 830) which when applied to the vehicle 100 (FIG. 8, Block 840) produces a vehicle rate of movement and a change in vehicle attitude. In one aspect, the momentum wheel assembly 129 provides zero momentum steering augmentation to the pyramidal reaction wheel assembly 131. For example, the momentum wheel assembly 129 is sized, in one aspect, to provide a maximized augmentation to the steering provided by the reaction wheel assembly 131 for a given vehicle rate of movement which allows for a smaller reaction wheel assembly 131 when compared to a reaction wheel assembly that provides the given vehicle rate of movement by itself. In other aspects, the momentum wheel assembly 129 is sized to provide a maximized vehicle rate of movement for a given reaction wheel assembly 131 configuration (e.g. size, arrangement and/or number of reaction wheels) when compared to a reaction wheel assembly that provides the given vehicle rate of movement by itself. In another aspect, one or more of the controller 101 and controller module 140 controls the first attitude control module 120 and the second attitude control module 130 so the momentum built up in the reaction wheel assembly 131 is desaturated with (e.g. absorbed by) the momentum wheel assembly 129 allowing the angular velocity at which the reaction wheels spin to be reduced when the angular velocity at which the reaction wheels spin is at or near a maximum velocity. In one aspect, the momentum wheel assembly 129 can be used as a momentum storage device, where the momentum can be transferred to and from the vehicle. In other aspects, momentum can be transferred to and from the reaction wheel assembly 131 as well. In one aspect the vehicle 100 includes one or more attitude sensors 715 for sensing and estimating the vehicle rate of movement and the vehicle attitude. In one aspect the one or more attitude sensors 715 include processors 701 for estimating the vehicle rate of movement and the vehicle attitude while in other aspects, one or more of controller 101 and controller module 140 receives signal from the sensors for estimating the vehicle rate of movement and the vehicle attitude. One or more of the controller 101 and controller module 140, such as the processor 141 of the controller module 140, receives the sensor signals or the estimated vehicle rate of movement and the vehicle attitude for further generating torque commands, such as, for example, in a control loop, until the vehicle 100 reaches a desired rate of movement and/or the vehicle attitude. To generate the desired rate of movement and/or position the vehicle 100 at a predetermined attitude the controller module 140, in one aspect, controls the first attitude control module 120 and the second attitude control module 130 in combination. In another aspect, the controller module 140 controls the first attitude control module 120 and the second attitude control module 130 independently while in still other aspects the controller module 140 controls the first attitude control module 120 and the second attitude control module 130 in a predetermined sequence.

The disclosure and drawing figures describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Figure 9:
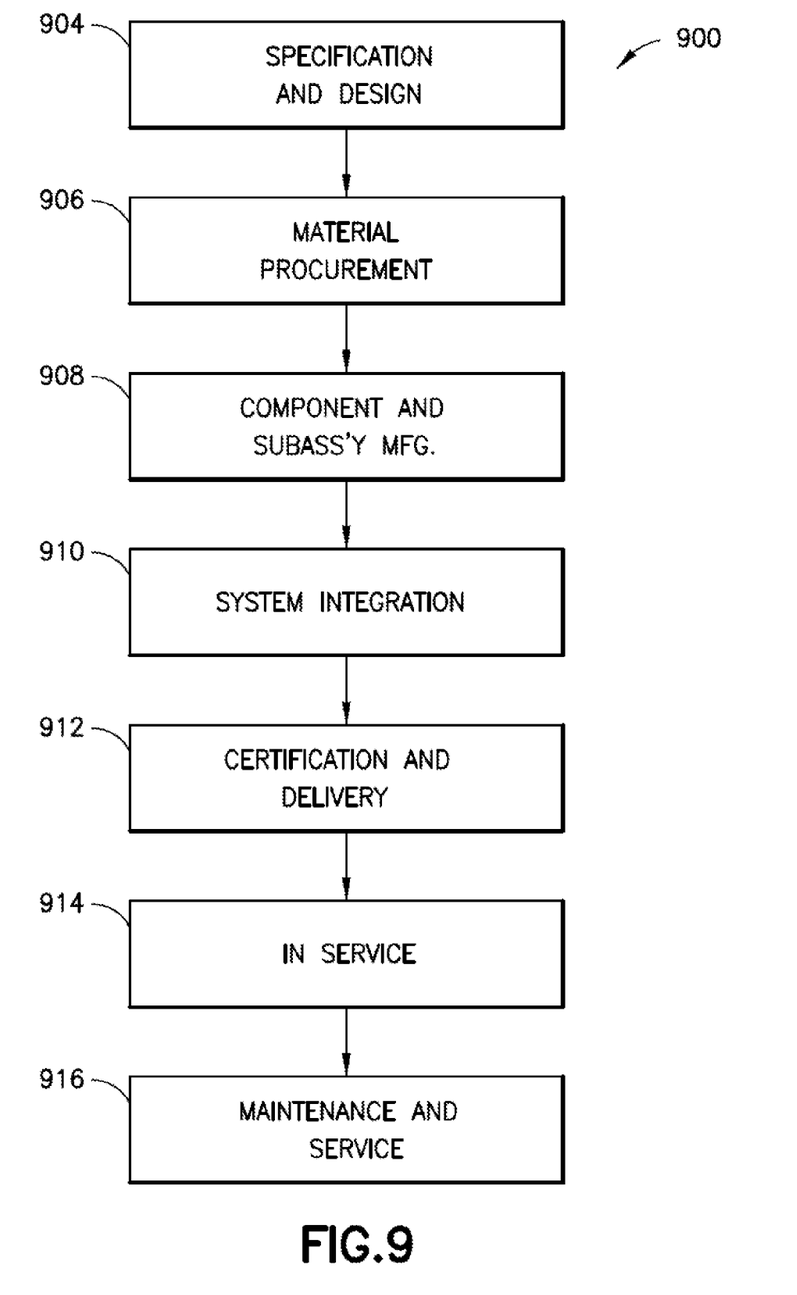
FIG. 9 is a flow diagram of spacecraft production and service methodology.
Figure 10:
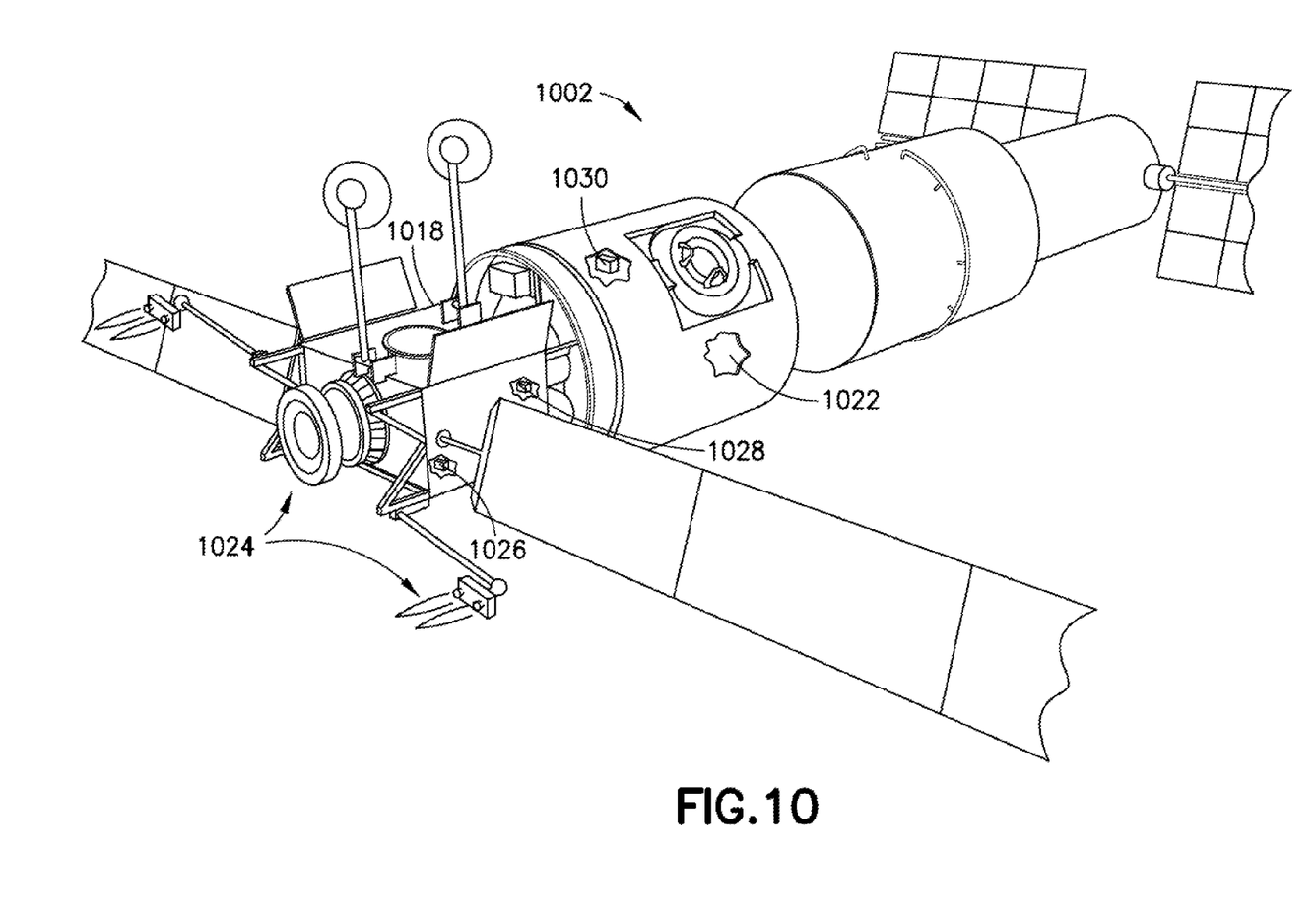
FIG. 10 is a schematic illustration of a spacecraft including distributed vehicle systems.

Examples of the disclosure may be described in the context of a spacecraft manufacturing and service method 900 as shown in FIG. 9 and a spacecraft 1002 as shown in FIG. 10. During pre-production, illustrative method 900 may include specification and design 904 of the spacecraft 1002 and material procurement 906. During production, component and subassembly manufacturing 908 and system integration 910 of the spacecraft 1002 take place. Thereafter, the spacecraft 1002 may go through certification and delivery 912 to be placed in service 914. While in service by a customer, the spacecraft 1002 is scheduled for routine maintenance and service 916 (which may also include modification, reconfiguration, refurbishment, and so on).

Each of the processes of the illustrative method 900 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

As shown in FIG. 10, the spacecraft 1002 produced by the illustrative method 900 may include an airframe 1018 with a plurality of high-level systems and an interior 1022. Examples of high-level systems, which are distributed throughout the spacecraft, include one or more of a propulsion system 1024, an electrical power system 1026, a hydraulic system 1028, and an environmental system 1030. Any number of other systems may be included. Although an aerospace example is shown, the principles of the invention may be applied to other industries, such as the maritime industries.

The system and methods shown or described herein may be employed during any one or more of the stages of the manufacturing and service method 900. For example, components or subassemblies corresponding to component and subassembly manufacturing 908 may be fabricated or manufactured in a manner similar to components or subassemblies produced while the spacecraft 1002 is in service. Also, one or more aspects of the system, method, or combination thereof may be utilized during the production states 908 and 910, for example, by substantially expediting assembly of or reducing the cost of a spacecraft 1002. Similarly, one or more aspects of the system or method realizations, or a combination thereof, may be utilized, for example and without limitation, while the spacecraft 1002 is in service, e.g., operation, maintenance and service 916.

Different examples and aspects of the system and methods are disclosed herein that include a variety of components, features, and functionality. It should be understood that the various examples and aspects of the system and methods disclosed herein may include any of the components, features, and functionality of any of the other examples and aspects of the system and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

In accordance with one or more aspects of the present disclosure, a dual stage vehicle attitude control system includes a first attitude control module having at least two momentum wheels arranged to provide zero momentum vehicle attitude control, each momentum wheel comprises a limited travel two axis gimbal; a second attitude control module having reaction wheels arranged in a pyramid configuration to provide vehicle attitude control along at least one control axis that is common with a control axis of the at least two momentum wheels; and a controller connected to the first attitude control module and the second attitude control module, the controller being configured to coordinate actuation of the first attitude control module and the second attitude control module to rotate the vehicle in at least one of three axes of a vehicle.

In accordance with one or more aspects of the present disclosure, the controller is configured to actuate the first attitude control module and the second attitude control module in combination.

In accordance with one or more aspects of the present disclosure, the controller is configured to actuate the first attitude control module and the second attitude control module independently.

In accordance with one or more aspects of the present disclosure, the controller is configured to actuate the first attitude control module and the second attitude control module in a predetermined sequence.

In accordance with one or more aspects of the present disclosure, the at least two momentum wheels are arranged to provide zero momentum vehicle attitude control along at least two of three axes of the vehicle.

In accordance with one or more aspects of the present disclosure, the limited travel two axis gimbal comprises at least two actuators, a momentum wheel platform and a base, the momentum wheel being mounted to the momentum wheel platform and the at least two actuators provide for relative movement between the momentum wheel platform and the base, the travel of the limited travel gimbal being limited by one or more of an amount of travel of the at least two actuators and limiting structure of the base.

In accordance with one or more aspects of the present disclosure, the at least two actuators are sized to provide a torque level substantially equal to a cross product of an angular velocity vector of the limited travel two axis gimbal and an angular momentum vector of the momentum wheel.

In accordance with one or more aspects of the present disclosure, an angular momentum vector of each of the at least two momentum wheels is arranged along a common axis of the vehicle, and the pyramid configuration is oriented with the reaction wheels tipped toward the common axis of the vehicle.

In accordance with one or more aspects of the present disclosure, the at least one control axis that is common with the control axis of the at least two momentum wheels is a scan axis of the vehicle.

In accordance with one or more aspects of the present disclosure, a method for controlling an attitude of a vehicle includes controlling actuation of a first attitude control module and a second attitude control module to rotate the vehicle in at least one of three axes of the vehicle, where controlling actuation of the first attitude control module includes pivoting each momentum wheel along two of the three axes of the vehicle with a limited travel two axis gimbal; wherein the first attitude control module is a momentum wheel module providing zero momentum vehicle attitude control at a first level of agility and the second attitude control module is a pyramidal reaction wheel module providing vehicle attitude control along at least one control axis that is common with a control axis of the momentum wheel module at a second level of agility, where the first level of agility is greater than the second level of agility.

In accordance with one or more aspects of the present disclosure, the actuation of the first attitude control module and the second attitude control module is hierarchically coordinated depending on a predetermined rate of angular acceleration needed to orient the vehicle.

In accordance with one or more aspects of the present disclosure, the first attitude control module and the second attitude control module are controlled in combination.

In accordance with one or more aspects of the present disclosure, the first attitude control module and the second attitude control module are controlled independently.

In accordance with one or more aspects of the present disclosure, the first attitude control module and the second attitude control module are controlled in a predetermined sequence.

In accordance with one or more aspects of the present disclosure, controlling actuation of the first attitude control module includes pivoting each momentum wheel along two of the three axes of the vehicle with a limited travel two axis gimbal.

In accordance with one or more aspects of the present disclosure, an angular momentum vector of each momentum wheel in the momentum wheel module is arranged along a scan axis of the vehicle, and each reaction wheel of the pyramidal reaction wheel module is tipped toward the scan of the vehicle.

In accordance with one or more aspects of the present disclosure, controlling actuation of the first attitude control module and second attitude control module effects a first level of angular acceleration to move the vehicle between points within a first angular field of regard and effects a second level of angular acceleration to orient the vehicle to a second angular field of regard different from the first angular field of regard, where the second level of angular acceleration is less than the first level of angular acceleration.

In accordance with one or more aspects of the present disclosure, the second level of angular acceleration provides up to three axis movement of the vehicle and the first level of angular acceleration provides two axis movement of the vehicle.

In accordance with one or more aspects of the present disclosure, a dual stage vehicle attitude control system includes a first attitude control module having at least two momentum wheels arranged to provide zero momentum vehicle attitude control, each momentum wheel comprises a limited travel two axis gimbal that pivots the momentum wheel along two of the three axes of the vehicle; a second attitude control module having reaction wheels arranged in a pyramid configuration to provide vehicle attitude control along at least one control axis that is common with a control axis of the at least two momentum wheels; and a controller connected to the first attitude control module and the second attitude control module, the controller being configured to coordinate actuation of the first attitude control module and the second attitude control module to rotate the vehicle in at least one of three axes of a vehicle so the at least two momentum wheels provide zero momentum steering augmentation to the reaction wheels.

In accordance with one or more aspects of the present disclosure, the controller is configured to actuate the first attitude control module and the second attitude control module in combination.

In accordance with one or more aspects of the present disclosure, the controller is configured to actuate the first attitude control module and the second attitude control module independently.

In accordance with one or more aspects of the present disclosure, the controller is configured to actuate the first attitude control module and the second attitude control module in a predetermined sequence.

In accordance with one or more aspects of the present disclosure, the limited travel two axis gimbal comprises at least two actuators, a momentum wheel platform and a base, the momentum wheel being mounted to the momentum wheel platform and the at least two actuators provide for relative movement between the momentum wheel platform and the base, the travel of the limited travel gimbal being limited by one or more of an amount of travel provided by the at least two actuators and limiting structure of the base.

In accordance with one or more aspects of the present disclosure, the at least two actuators are sized to provide a torque level substantially equal to a cross product of an angular velocity vector of the limited travel two axis gimbal and an angular momentum vector of the momentum wheel.

In accordance with one or more aspects of the present disclosure, an angular momentum vector of each of the momentum wheels is arranged along a scan axis of the vehicle, and the pyramid configuration is oriented with the reaction wheels tipped toward the scan axis of the vehicle.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. A dual stage vehicle attitude control system comprising:
    a first attitude control module having at least two momentum wheels arranged to provide zero momentum vehicle attitude control, each momentum wheel comprises a limited travel two axis gimbal that pivots the momentum wheel along two of three axes of the vehicle;
    a second attitude control module having reaction wheels arranged in a pyramid configuration to provide vehicle attitude control along at least one control axis that is common with a control axis of the at least two momentum wheels; and
    a controller connected to the first attitude control module and the second attitude control module, the controller being configured to coordinate actuation of the first attitude control module and the second attitude control module to rotate the vehicle in at least one of three axes of a vehicle.

2. The dual stage vehicle attitude control system of claim 1, wherein the controller is configured to actuate the first attitude control module and the second attitude control module in combination.

3. The dual stage vehicle attitude control system of claim 1, wherein the controller is configured to actuate the first attitude control module and the second attitude control module independently.

4. The dual stage vehicle attitude control system of claim 1, wherein the controller is configured to actuate the first attitude control module and the second attitude control module in a predetermined sequence.

5. The dual stage vehicle attitude control system of claim 1, wherein the at least two momentum wheels are arranged to provide zero momentum vehicle attitude control along at least two of three axes of the vehicle.

6. The dual stage vehicle attitude control system of claim 1, wherein the limited travel two axis gimbal comprises at least two actuators, a momentum wheel platform and a base, each momentum wheel being mounted to the momentum wheel platform and the at least two actuators provide for relative movement between the momentum wheel platform and the base, the travel of the limited travel gimbal being limited by one or more of an amount of travel of the at least two actuators and limiting structure of the base.

7. The dual stage vehicle attitude control system of claim 6, wherein the at least two actuators are sized to provide a torque level substantially equal to the cross product of an angular velocity vector of the limited travel two axis gimbal and an angular momentum vector of each momentum wheel.

8. The dual stage vehicle attitude control system of claim 1, wherein an angular momentum vector of each of the at least two momentum wheels is arranged along a common axis of the vehicle, and the pyramid configuration is oriented with the reaction wheels tipped toward the common axis of the vehicle.

9. The dual stage vehicle attitude control system of claim 1, wherein the at least one control axis that is common with the control axis of the at least two momentum wheels is a scan axis of the vehicle.

10. A method for controlling an attitude of a vehicle, the method comprising:
    controlling actuation of a first attitude control module and a second attitude control module to rotate the vehicle in at least one of three axes of the vehicle, where controlling actuation of the first attitude control module includes pivoting each momentum wheel along two of the three axes of the vehicle with a limited travel two axis gimbal; and
    wherein the first attitude control module is a momentum wheel module providing zero momentum vehicle attitude control at a first level of agility and the second attitude control module is a pyramidal reaction wheel module providing vehicle attitude control along at least one control axis that is common with a control axis of the momentum wheel module at a second level of agility, where the first level of agility is greater than the second level of agility.

11. The method of claim 10, wherein the actuation of the first attitude control module and the second attitude control module is hierarchically coordinated depending on a predetermined rate of angular acceleration needed to orient the vehicle.

12. The method of claim 10, wherein the first attitude control module and the second attitude control module are controlled in combination.

13. The method of claim 10, wherein the first attitude control module and the second attitude control module are controlled independently.

14. The method of claim 10, wherein the first attitude control module and the second attitude control module are controlled in a predetermined sequence.

15. The method of claim 10, wherein an angular momentum vector of each momentum wheel in the momentum wheel module is arranged along a scan axis of the vehicle, and each reaction wheel of the pyramidal reaction wheel module is tipped toward the scan of the vehicle.

16. The method of claim 10, wherein controlling actuation of the first attitude control module and second attitude control module effects a first level of angular acceleration to move the vehicle between points within a first angular field of regard and effects a second level of angular acceleration to orient the vehicle to a second angular field of regard different from the first angular field of regard, where the second level of angular acceleration is less than the first level of angular acceleration.

17. The method of claim 16, wherein the second level of angular acceleration provides up to three axis movement of the vehicle and the first level of angular acceleration provides two axis movement of the vehicle.

18. A dual stage vehicle attitude control system comprising:
a first attitude control module having at least two momentum wheels arranged to provide zero momentum vehicle attitude control, each momentum wheel comprises a limited travel two axis gimbal that pivots the momentum wheel along two of three axes of the vehicle;
a second attitude control module having reaction wheels arranged in a pyramid configuration to provide vehicle attitude control along at least one control axis that is common with a control axis of the at least two momentum wheels; and
a controller connected to the first attitude control module and the second attitude control module, the controller being configured to coordinate actuation of the first attitude control module and the second attitude control module to rotate the vehicle in at least one of three axes of a vehicle so the at least two momentum wheels provide zero momentum steering augmentation to the reaction wheels.

19. The dual stage vehicle attitude control system of claim 18, wherein the controller is configured to actuate the first attitude control module and the second attitude control module in combination.

20. The dual stage vehicle attitude control system of claim 18, wherein the controller is configured to actuate the first attitude control module and the second attitude control module independently.

21. The dual stage vehicle attitude control system of claim 18, wherein the controller is configured to actuate the first attitude control module and the second attitude control module in a predetermined sequence.

22. The dual stage vehicle attitude control system of claim 18, wherein the limited travel two axis gimbal comprises at least two actuators, a momentum wheel platform and a base, the momentum wheel being mounted to the momentum wheel platform and the at least two actuators provide for relative movement between the momentum wheel platform and the base, the travel of the limited travel gimbal being limited by one or more of an amount of travel provided by the at least two actuators and limiting structure of the base.

23. The dual stage vehicle attitude control system of claim 22, wherein the at least two actuators are sized to provide a torque level substantially equal to the cross product of an angular velocity vector of the limited travel two axis gimbal and an angular momentum vector of the momentum wheel.

24. The dual stage vehicle attitude control system of claim 18, wherein an angular momentum vector of each of the momentum wheels is arranged along a scan axis of the vehicle, and the pyramid configuration is oriented with the reaction wheels tipped toward the scan axis of the vehicle.

* * * * *